(12) United States Patent
Kim et al.

(10) Patent No.: US 10,447,597 B1
(45) Date of Patent: Oct. 15, 2019

(54) PATH AND LATENCY TRACKING

(71) Applicant: Barefoot Networks, Inc., Santa Clara, CA (US)

(72) Inventors: Changhoon Kim, Palo Alto, CA (US); Jeongkeun Lee, Mountain View, CA (US); Parag Bhide, San Ramon, CA (US); Jithin Thomas, Santa Clara, CA (US); Xiaozhou Li, San Jose, CA (US); Georgios Nikolaidis, Palo Alto, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 147 days.

(21) Appl. No.: 15/600,751

(22) Filed: May 21, 2017

Related U.S. Application Data

(60) Provisional application No. 62/340,046, filed on May 23, 2016.

(51) Int. Cl.
| | |
|---|---|
| *H04L 12/801* | (2013.01) |
| *H04L 12/24* | (2006.01) |
| *H04L 12/26* | (2006.01) |
| *H04L 29/12* | (2006.01) |

(52) U.S. Cl.
CPC ............ *H04L 47/12* (2013.01); *H04L 41/08* (2013.01); *H04L 43/0876* (2013.01); *H04L 61/6018* (2013.01)

(58) Field of Classification Search
None
See application file for complete search history.

(56) References Cited

U.S. PATENT DOCUMENTS

| | | | |
|---|---|---|---|
| 2005/0018602 A1* | 1/2005 | Labovitz | H04L 41/12 370/229 |
| 2008/0219181 A1 | 9/2008 | Kodialam et al. | |
| 2011/0228696 A1* | 9/2011 | Agarwal | H04L 41/12 370/253 |

(Continued)

OTHER PUBLICATIONS

Non-published commonly owned U.S. Appl. No. 15/726,347, filed Oct. 5, 2017, 51 pages, Barefoot Networks, Inc.

(Continued)

*Primary Examiner* — Saumit Shah
(74) *Attorney, Agent, or Firm* — Adeli LLP

(57) ABSTRACT

Some embodiments of the invention provide a path-and-latency tracking (PLT) method. At a forwarding element, this method in some embodiments detects the path traversed by a data message through a set of forwarding elements, and the latency that the data message experiences at each of the forwarding elements in the path. In some embodiments, the method has a forwarding element in the path insert its forwarding element identifier and path latency in a header of the data message that it forwards. The method of some embodiments also uses fast PLT operators in the data plane of the forwarding elements to detect new data message flows, to gather PLT data from these data message flows, and to detect path or latency changes for previously detected data message flows. In some embodiments, the method then uses control plane processes (e.g., of the forwarding elements or other devices) to collect and analyze the PLT data gathered in the data plane from new or existing flows.

15 Claims, 9 Drawing Sheets

(56) References Cited

U.S. PATENT DOCUMENTS

2012/0075999 A1 3/2012 Ko et al.
2017/0317919 A1* 11/2017 Fernando .............. H04L 61/103

OTHER PUBLICATIONS

Jeyakumar, Vimalkumar, et al., "Millions of Little Minions: Using Packets for Low Latency Network Programming and Visibility," SIGCOMM'14, Aug. 17-22, 2014, 12 pages, ACM, Chicago, IL, USA.

* cited by examiner

PATH AND LATENCY TRACKING

BACKGROUND

Identifying congestion in a network has been a long-term goal in the field of networking. Many schemes have been proposed to date for identifying and avoiding congested segments of a network. However, most of these schemes still cannot rapidly detect congestion. This is often because most of the proposed solutions require control plane processes to detect path changes and identify changes to path latencies. Accordingly, there is a need for forwarding elements with robust data plane path and latency trackers that can detect path and latency changes in real time at data line rates at which the forwarding elements forward data messages.

SUMMARY

Some embodiments of the invention provide a path-and-latency tracking (PLT) method. At a forwarding element, this method in some embodiments detects the path traversed by a data message through a set of forwarding elements, and the latency that the data message experiences at each of the forwarding elements in the path. In some embodiments, the method has a forwarding element in the path insert its forwarding element identifier and path latency in a header of the data message that it forwards.

In some embodiments, the forwarding element identifiers are inserted in a path identifier field of the data message header, which any subsequent particular forwarding element can analyze to identify the sequence of forwarding elements, and thereby the path, that a message took to reach particular forwarding element. Similarly, in some embodiments, each particular forwarding element can sum the path latency values stored by previous forwarding elements in the message's header to compute an overall path latency value that the message has experienced to reach the particular forwarding element. In some of these embodiments, the message header has a field for storing the overall path latency value, and each forwarding element adds its latency value to the value in this field. This operation in some embodiments can be performed instead of storing the individual path latency values at each forwarding element.

The method of some embodiments also uses fast PLT operators in the data plane of the forwarding elements to detect new data message flows, to gather PLT data from these data message flows, and to detect path or latency changes for previously detected data message flows. In some embodiments, the method then uses control plane processes (e.g., of the forwarding elements or other devices) to collect and analyze the PLT data gathered in the data plane from new or existing flows.

In some embodiments, the fast PLT operator in a forwarding element's data plane (1) detects a data message flow that is new for that forwarding element (e.g., a data message flow that is or appears to be a new data message flow for the forwarding element), (2) identifies the path (through the set of prior forwarding elements) traversed by the new data message flow to the forwarding element, and (3) identifies the latency that the data message flow is experiencing at each prior forwarding element on the path. The discussion below refers to each forwarding element traversed by a data message as a hop along the path.

For a previously detected data message flow, the data plane PLT operator in some embodiments can also quickly detect whether the data message flow has changed the path that it has taken to the forwarding element (i.e., whether one or more forwarding elements have been added and/or removed to the set of prior forwarding elements traversed by the received data message). Also, for a previously detected data message flow, this data plane PLT operator in some embodiments can also quickly detect whether the hop latency has significantly changed at one or more forwarding elements along the flow's path.

To reduce the PLT workload on the forwarding elements of a network, the PLT method of some embodiments only has the data plane PLT operator of a data message flow's last hop (i.e., of the forwarding element connected to a destination node of the data message flow) report PLT data for the data message flow. The method of these embodiments uses the PLT operator of each prior hop to insert the hop's forwarding element identifier and hop latency in the headers of the data messages of the flow that passes through the hop.

After detecting a new data message flow, or detecting path or latency changes for a previously detected data message flow, the PLT operator of the last hop forwards to a control plane process of the last hop or of another device the path information (e.g., the forwarding element identifiers) and latency values (e.g., hop latency values of the forwarding elements along the path) that are embedded in the new data message's header. The control plane process then analyzes this data with any other PLT data that it has previously received for the data message flow to identify the flow's path, its individual hop latency value, and its overall hop latency value. In some embodiments, the control plane process produces other analysis data based on this identified data.

For a flow, the PLT operator of the flow's last hop maintains an encoded path value and an encoded latency value that allow the operator to quickly detect (1) changes to the flow's path, and/or (2) changes to the flow's latency value(s) at one or more hops along the flow's path. In some embodiments, the encoded path value is generated by applying a Boolean operator (e.g., a multi-bit XOR operator that generates a multi-bit XOR output with one bit for each path bit value) or a hash operator to the identifiers of all the forwarding elements along the path. The last hop's PLT operator can quickly detect that the flow's path has changed when it receives a new encoded value for a data message in this flow that is different from an encoded path value that this operator previously stored for the flow.

In some embodiments, the last hop's PLT operator can similarly detect changes to the flow's hop latency values. For instance, the PLT operators in some embodiments discretize the hop latency values to fall into a set of quantized latency values, and then compute the flow's encoded latency value by applying a Boolean operator (e.g., an XOR operator) or a hash operator to the quantized latency values of all the forwarding elements along the path. To quantize a latency value, the PLT operators in some embodiments shift the bits that express the latency values (i.e., perform the quantization operation by using a bit shift operation). The last hop's PLT operator stores this encoded value, and when it detects that this value has changed for a new data message in the flow, it determines that at least one of the latency values for the flow has changed.

Instead of checking separate encoded values for the flow's path and hop latency, the last hop's PLT operator checks one encoded value that represents both the flow's path and hop latency values. Anytime the flow's path changes, or hop latency changes at one of the previous hops, the PLT operator detects that a new encoded path/latency value for a new data message in the flow is different than a previously stored encoded path/latency value for this flow, and reports to the control plane the path (e.g., forwarding element identifiers) and latency values that accompany the new message.

To reduce the workload on the PLT operator at the last hop, the PLT operators in the flow's prior hops generate path encoding values, latency encoding values, and/or combined path and latency encoding values, and incorporate these encoding values in the headers of the data messages of the flows that they pass to the next hop in the path. To compute its own encoding value (e.g., the encoded path identifier for identifying all prior forwarding elements), a prior hop PLT operator takes the corresponding encoding value (e.g., the encoded path identifier) that it receives from the previous hop (if any), and uses the Boolean or hash operator to combine its corresponding value (e.g., its forwarding element identifier) with the encoding value received from the previous hop. This approach allows the last hop's PLT operator to quickly determine whether the path or latency values have changed by comparing the overall path encoding value, latency encoding value, or combined path/latency encoding value with corresponding such values that the last hop's PLT operator previously stored as the current path encoding value, latency encoding value, or combined path/latency encoding value.

The last hop PLT operator in different embodiments uses different connection state data storages to determine whether it has seen a flow before and if so, to store the current path encoding value, latency encoding value, or combined path/latency encoding value for this flow. In some embodiments, the connection state data storages are learning filters. The encoded values that are stored in the learning filter of some embodiments not only represent the path and latency values for each flow, but also include the flow identifier of the flow. These three tuples (path, hop latency, and flow identifier) are encoded as one value that is referred to below as the encoded PLF value of the flow.

The learning filter of some embodiments stores the encoded PLF value for a flow at N different locations in the hash storage in some embodiments. This filter has an N-way hasher that generates N hash values from a received data message's flow identifier (e.g., five tuple identifier). The N hash values represent addresses of N locations in a hash storage. All locations in the hash storage are initialized to one value (e.g., to 0) at the start of the operation of the last hop forwarding element. Also, to clean up the learning filter, different sections of the hash storage are reset to their initial values periodically or whenever needed. This cleaning may lead the learning filter to detect false positive events (e.g., new flows, or old flows with modified PLT data), but the control plane processes catch these false positives.

When any one of the values at N addressed locations in the learning filter is the initialized values (e.g., is zero), the last hop PLT operator determines that the received data message is part of a new flow. It therefore generates a report for the control plane that provides this message's flow identifier (e.g., five tuple identifier), and its extracted path information and hop latency values that were stored in the data message's header value. In this situation, the PLT operator also stores the encoded PLF value that the last hop extracts from the data message header and stores this value at the three locations identified by the address generator.

When none of the values at the N addressed locations is the initialized value, and at least one of the N outputted values matches the message's extracted, encoded PLF value, the PLT operator determines that the PLT data for the received data message's flow has not changed. Even though the PLT data has not changed, the PLT operator stores the extracted, encoded PLF value at the N locations identified by the N-way hasher. On the other hand, when none of the values at the N addressed locations is the initialized value, and not one of the N outputted values matches the message's extracted, encoded PLF value, the PLT operator (1) generates a report for the control plane that provides this message's flow identifier (e.g., five tuple identifier), and its extracted path information and hop latency values, and (2) stores the extracted, encoded PLF value at the N locations identified by the N-way hasher.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
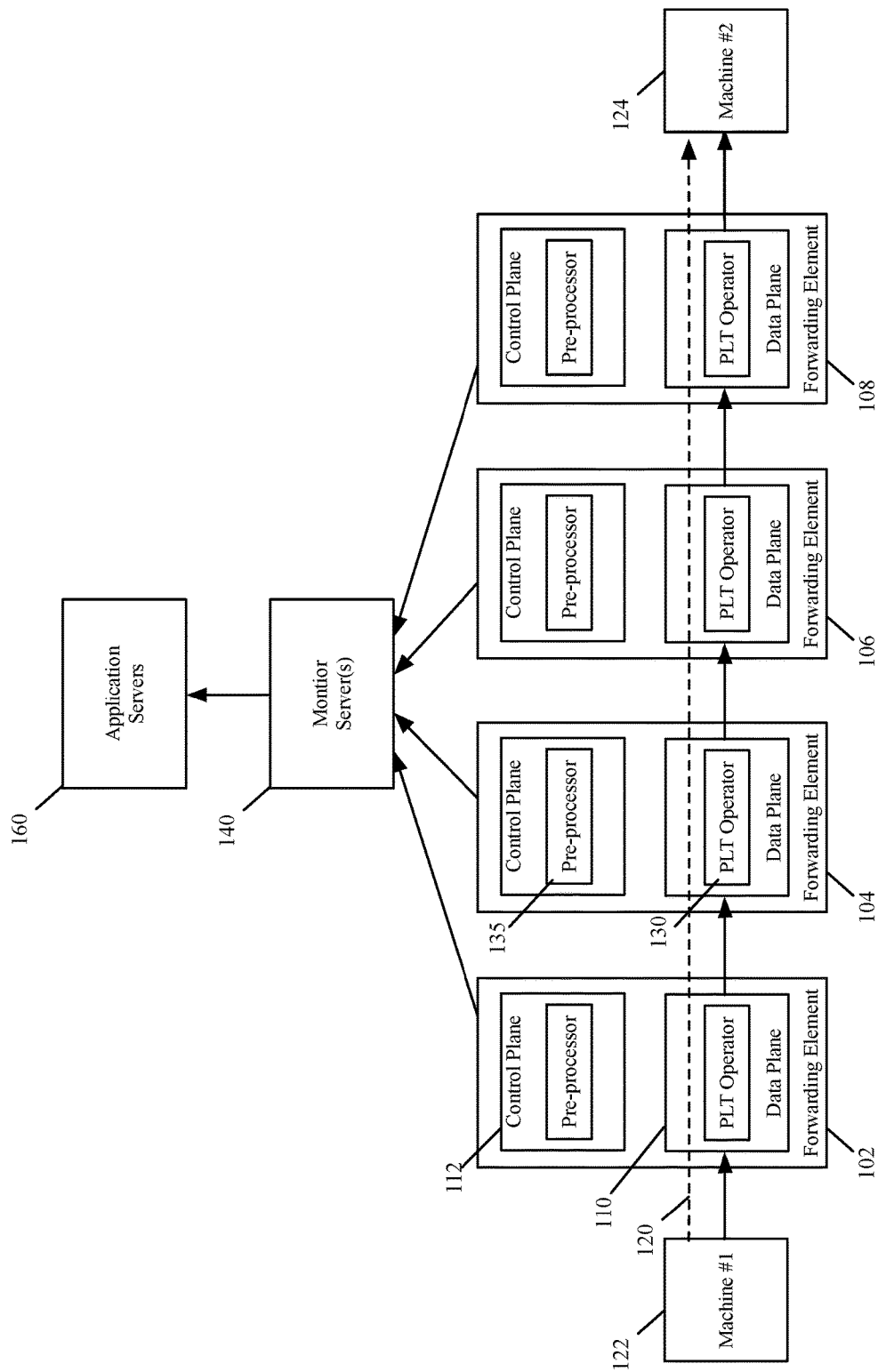
FIG. 1 illustrates an example several forwarding elements that implement the PLT method of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a path-and-latency tracking (PLT) method. At a forwarding element, this method in some embodiments detects the path traversed by a data message through a set of forwarding elements, and the latency that the data message experiences at each of the forwarding elements in the path. In some embodiments, the method has each forwarding element in the path insert its forwarding element identifier and path latency in a header of the data message that it forwards.

In some embodiments, the forwarding element identifiers are inserted in a path identifier field of a data message header, which any subsequent particular forwarding element can analyze to identify the sequence of forwarding elements, and thereby the path, that a message took to reach particular forwarding element. Similarly, in some embodiments, each particular forwarding element can sum the path latency values stored by previous forwarding elements in the message's header to compute an overall path latency value that the message has experienced to reach the particular forwarding element. In some of these embodiments, the message header has a field for storing the overall path latency value, and each forwarding element adds its latency value to the value in this field. This operation in some embodiments can be performed instead of storing the individual path latency values at each forwarding element.

The method of some embodiments also uses fast PLT operators in the data plane of the forwarding elements to detect new data message flows, to gather PLT data from these data message flows, and to detect path or latency changes for previously detected data message flows. In some embodiments, the method then uses control plane processes (e.g., of the forwarding elements or other devices) to collect and analyze the PLT data gathered in the data plane from new or existing flows.

The discussion below refers to each forwarding element traversed by a data message as a hop along the path. As used in this document, a data message generically refers to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates an example of several forwarding elements that implement the PLT method of some embodiments of the invention. This figure shows four forwarding elements 102, 104, 106, and 108 that lie along a data path 120 between two machines 122 and 124 in a network. In some embodiments, the machines can be standalone computers, virtual machines (VMs) or containers. In several embodiments described below, each forwarding element 102-108 is a hardware forwarding element (e.g., a hardware switch, top of rack switch, hardware router, etc.). In other embodiments, one or more of these forwarding elements is a software forwarding element (e.g., a software switch, software router, etc.) executing on a standalone machine or on a host machine with other VMs or containers.

As shown, each hardware forwarding element 102-108 has (1) a set of data plane circuits 110 (the data plane 110) for forwarding data messages received along the data path to their destinations, and (2) a set of control plane circuits 112 (the control plane 112) for configuring the data plane. Each forwarding element's data plane includes a fast PLT operator 130. The data plane included multiple message processing pipelines, with each pipeline comprising several data message processing stages (e.g., multiple match-action units, MAUs). As further described below, the data message processing stages of some embodiments include stateful processing units (e.g., stateful arithmetic logic units (ALUs) with stateful memories) that are used to implement PLT operators 130 that perform their operations at the line rates at which the data plane 110 performs its data message forwarding operations.

In all forwarding elements except the last hop (i.e., except the forwarding element connected to the destination of a data message), the PLT operator inserts its forwarding element identifier and path latency in a header of the data message that it receives, and then forwards this data message along the path 120 with the inserted identifier and latency value in its header. The PLT operator of a forwarding element can also (1) detect a data message flow that is new for that forwarding element (e.g., a data message flow that is or appears to be a new data message flow for the forwarding element), (2) identify the path (through the set of prior forwarding elements) traversed by the new data message flow to the forwarding element, and (3) identify the latency that the data message flow is experiencing at each prior forwarding element on the path.

For a previously detected data message flow, the data plane PLT operator 130 in some embodiments can also quickly detect whether the data message flow has changed the path it that it has taken to the forwarding element (i.e., whether one or more forwarding elements have been added and/or removed to the set of prior forwarding elements traversed by the data messages in the flow). Also, for a previously detected data message flow, the forwarding element's PLT operator 130 in some embodiments can also quickly detect whether the hop latency has significantly changed at one or more forwarding elements along the flow's path.

After detecting a new data message flow, or detecting path or latency changes for a previously detected data message flow, the data-plane PLT operator 130 of the forwarding element can forward to a control plane process of the forwarding element or of another device (such as a server or controller) the path information (e.g., the forwarding element identifiers) and latency values (e.g., hop latency values of the forwarding elements along the path) that are embedded in the data message's header. In the example illustrated in FIG. 1, the PLT operators 130 provide their PLT data to pre-processors 135 of the control planes 112 of their forwarding elements, but in other embodiments, this data can be provided to other control plane processes of other forwarding elements or other devices. As further described below, the control plane 112 of a forwarding element is implemented by one or more general purpose central processing units (CPUs), while the data plane 110 of the forwarding element is implemented by application specific integrated circuit (ASIC) that is custom made to perform the data plane operations.

After receiving the PLT data for a data message, the control plane process analyzes this data with any other PLT data that it has previously received for the data message's flow to identify (1) the flow's current path, (2) any differences between the flow's current path and any of its prior paths, if any, (3) the data message's hop latency value at each of its prior hops, and (4) the data message's overall hop latency value. In some embodiments, the control plane process produces other analysis data based on this identified data. In some embodiments, any number of applications can consume this data to further analyze this data, produce other data, and present the data to network administrators.

For example, the collected PLT data can be used in some embodiments (1) to confirm the effects of routing configuration or policy changes in real time, (2) to enable always-on network verification or auditing, (3) to quantify RIB-FIB inconsistency, (4) to identify connections affected by maintenance, failure or recovery events, and (5) to detect transient and long lasting congestions in real time and identify the victims. Other examples of network control and analysis application includes (1) real-time anomaly detection and alert (e.g., congestion, loops, un-used (dead) links or switches, imbalance of link utilization), (2) on-demand path visualization, and (3) traffic matrix generation.

Such control plane operations can be spread across any number of control plane processes. Different embodiments spread these operations in different ways across the different control plane layers. FIG. 1 illustrates one way of spreading these operations. In this example, the pre-processors 135 of the control plane component 112 of the forwarding elements create one or more connection records that express the different PLT values collected for the data messages of that flow at different instances in time. In case the PLT operators 130 report false PLT events (e.g., report a path change, or a changed latency value), the pre-processors 135 determine that the reported event is false and discard this report.

In some embodiments, the pre-processor 135 provides the connection records that express the different PLT values collected to PLT monitor 140, which analyzes these records to express the starting path and latency values of a flow, and any changes to the flow's path and latency values. In some embodiments, the PLT monitor 140 sorts and partitions the connection records that it receives from the pre-processors 135 of the forwarding elements 102-108, produces processed connection records and activity records from the sorted and partitioned connection records, and makes these processed records available to any number of application servers 160 that query the monitor's database for this data.

Figure 2:
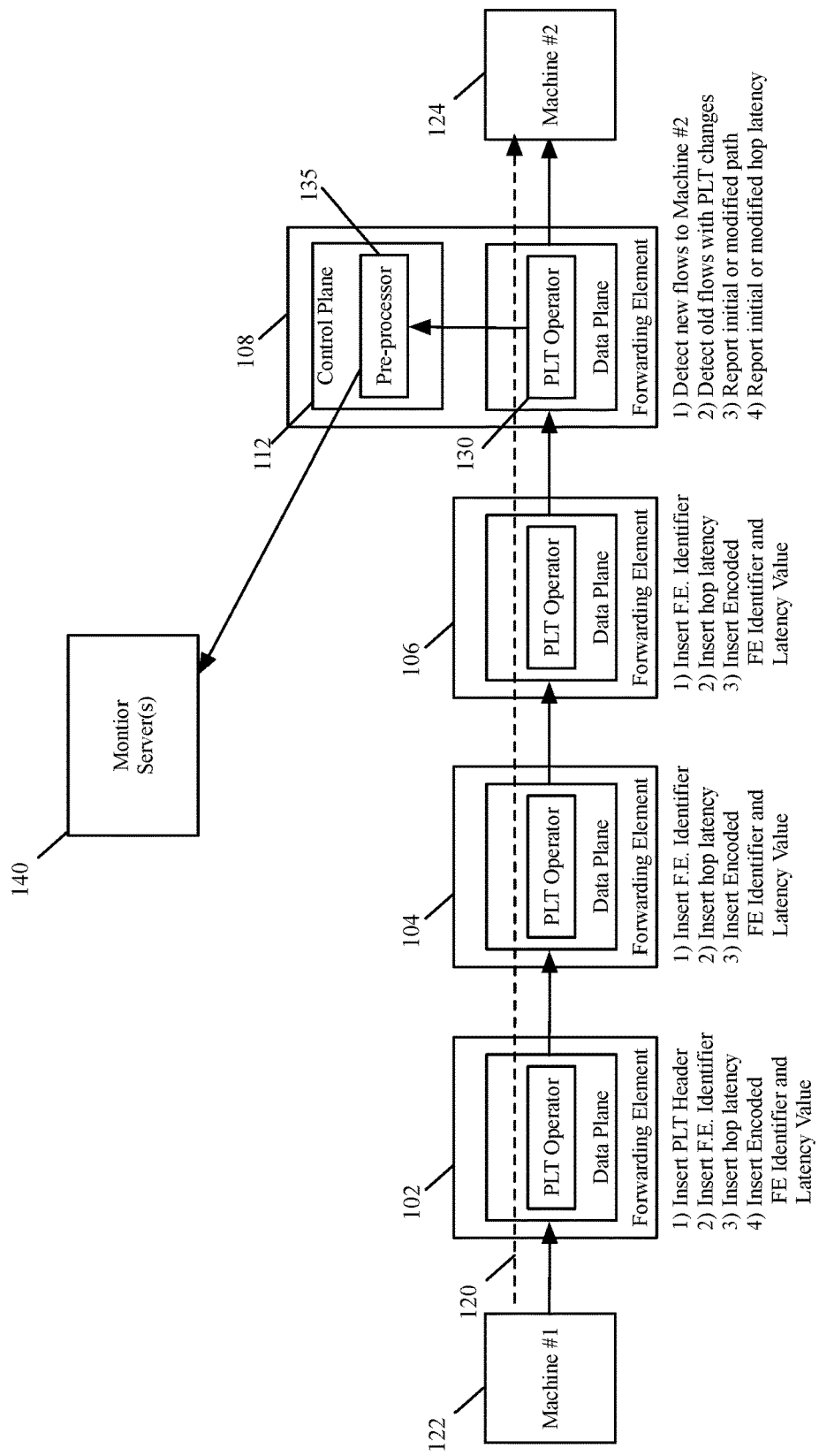
FIG. 2 illustrates another example several forwarding elements that implement the PLT method of some embodiments of the invention.

To reduce the PLT workload on the forwarding elements of a network, the PLT method of some embodiments divide this workload among the forwarding elements. For instance, in some embodiments, only the PLT operators of the last hops report PLT data to the control plane processes, while the PLT operators of the other hops insert encoded path and latency values that assist the last hop to quickly detect changes to path and latency values for flows that it terminates. FIG. 2 illustrates this division of labor for some embodiments of the invention. This figure shows the same data path 120 between the same two machines 122 and 124 as FIG. 1, but now only the last hop forwarding element 108 identifies and reports the PLT data for flows that are addressed to machine 124.

In this example, the forwarding element 108 is the last hop of the data messages from machine 122 to machine 124, as this forwarding is the forwarding element that connects to this machine. To reduce the PLT workload on the other forwarding elements, only the PLT operator 130 of the forwarding element 108 reports PLT data for the data message flow(s) from machine 122 to machine 124. The PLT operators of each of the prior hops 102, 104, and 106 just inserts the hop's forwarding element identifier and its latency in the headers of the data messages of the flow that pass through the hop. As further described below, the PLT operator of each prior hop 102, 104 or 106 also inserts in the header path and latency encoding(s) that a data message experiences up to that hop. In some embodiments, the PLT operator 130 of the first hop 102 also inserts a PLT header in the data message's header (e.g., in the data message's tunnel header, or between layer 3 and 4 headers, or after layer 4 header).

After detecting a new data message flow, or detecting path or latency changes for a previously detected data message flow, the PLT operator of the last hop 108 forwards to a pre-processor 135 of its control plane 112 the path information (e.g., the forwarding element identifiers) and latency values (e.g., hop latency values of the forwarding elements along the path) that are embedded in the new data message's header. The control plane process then creates connection records for the reported PLT data when such data is accurate (as the PLT operators of some embodiments might report false positive PLT events), and provides these connection records to the PLT monitor 140, which analyzes this data to identify the flow's path, its individual hop latency value, its overall hop latency value, and changes to the data.

For a flow, the PLT operator of the flow's last hop 108 maintains an encoded path value and an encoded latency value that allow this operator to quickly detect (1) changes to the flow's path, and/or (2) changes to the flow's latency value(s) at one or more hops along the flow's path. For instance, in some embodiments, the encoded path value is generated by applying a Boolean operator or a hash operator to the identifiers of all the forwarding elements along the path. In some embodiments, the Boolean operator is a multi-bit XOR operator that XORs corresponding bit values in several multi-bit values (e.g., several forwarding element identifiers) that it is processing in order to produce a multi-bit XOR output with one bit position. The last hop's PLT operator can quickly detect that the flow's path has changed when it receives a new encoded value for a data message in this flow that is different from an encoded path value that this operator previously stored for the flow.

In some embodiments, the last hop's PLT operator can similarly detect changes to the flow's hop latency values. For instance, the PLT operators in some embodiments discretize the hop latency values to fall into a set of quantized latency values, and then compute the flow's encoded latency value by applying a Boolean operator (e.g., an XOR) or a hash operator to the quantized latency values of all the forwarding elements along the path. To quantize a latency value, the PLT operators in some embodiments shift the bits that express the latency values (i.e., perform this quantization operation by using a bit shift operation). The last hop's PLT operator stores this encoded value, and when it detects that this value has changed for a new data message in the flow, it determines that at least one of the latency values for the flow has changed.

Instead of checking separate encoded values for the flow's path and hop latency, the last hop's PLT operator checks one encoded value that represents both the flow's path and its hop latency values. Anytime the flow's path changes or hop latency changes at one of the previous hops, the PLT operator detects that a new encoded path/latency value for a new data message in the flow is different than a previously stored encoded path/latency value for this flow, and reports to the control plane the path (e.g., forwarding element identifiers) and latency values that accompany the new message.

To reduce the workload on the PLT operator at the last hop, the PLT operators in the flow's prior hops 102-106 generate path encoding values, latency encoding values, and/or combined path and latency encoding values, and incorporate these encoding values in the headers of the data messages of the flows that they pass to the next hop in the path. To compute its own encoding value (e.g., the encoded path identifier for identifying all prior forwarding elements), the prior hop PLT operator takes the corresponding encoding value (e.g., the encoded path identifier) that it receives from the previous hop (if any), and uses the Boolean or hash operator to combine its corresponding value (e.g., its forwarding element identifier) with the encoding value received from the previous hop. This approach allows the last hop's PLT operator to quickly determine whether the path or latency values have changed by comparing the overall path encoding value, latency encoding value, or combined path/latency encoding value with corresponding such values that the last hop's PLT operator previously stored as the current overall path encoding value, latency encoding value, or combined path/latency encoding value.

Figure 3:
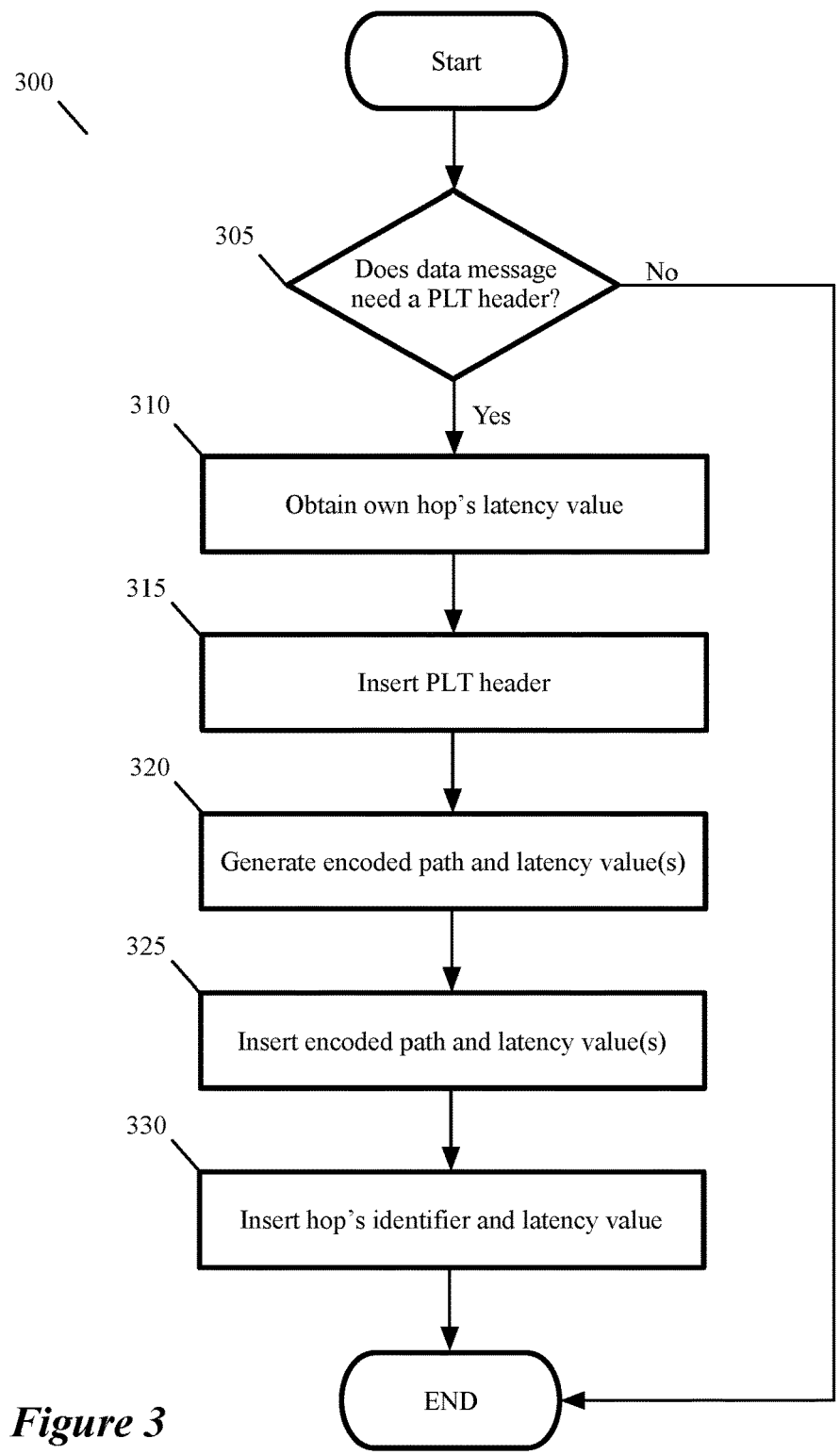
FIGS. 3-5 illustrate the PLT processes performed by the PLT operators of the first, intervening and last hops of a data message.
Figure 4:
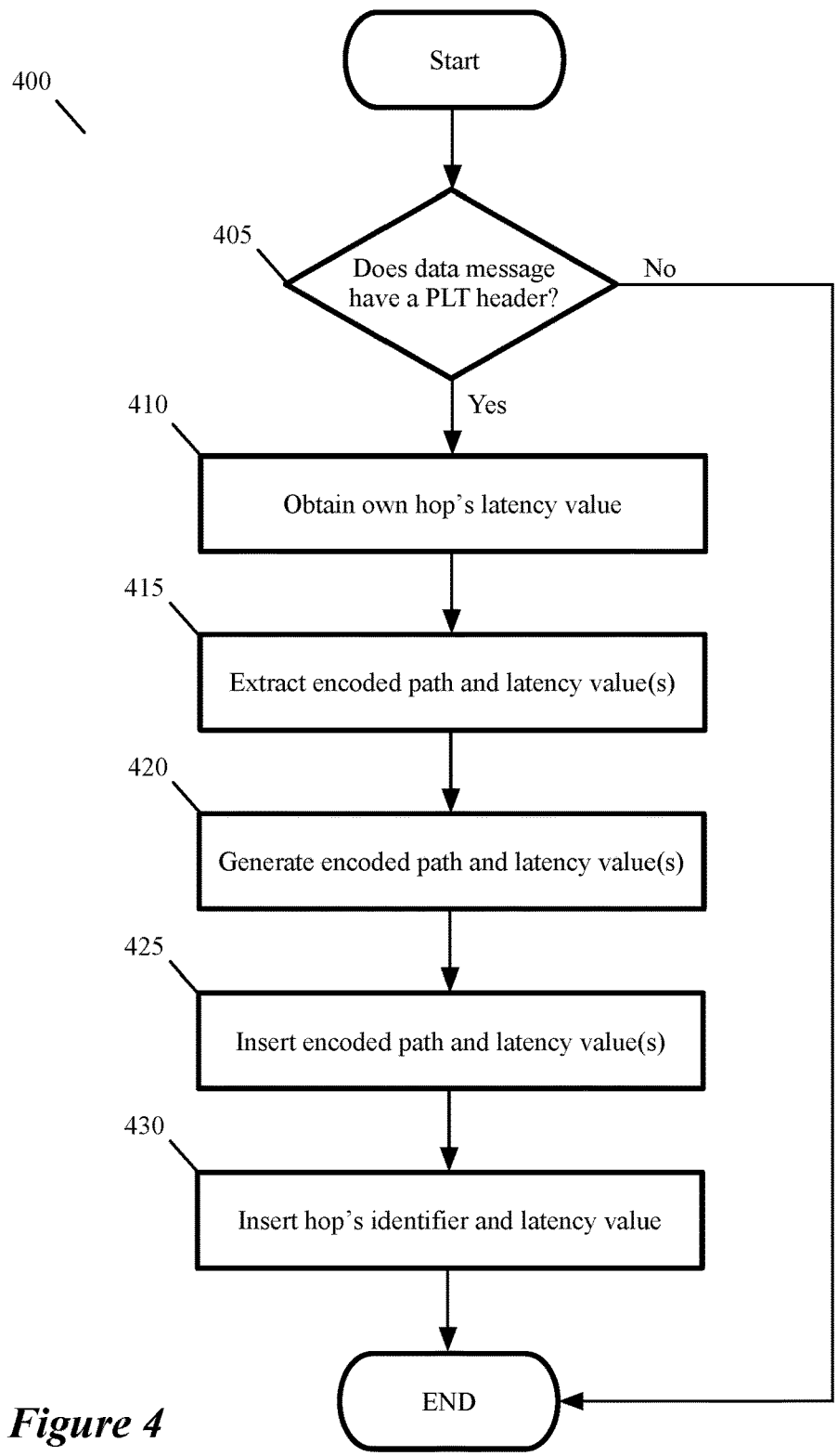
Figure 5:
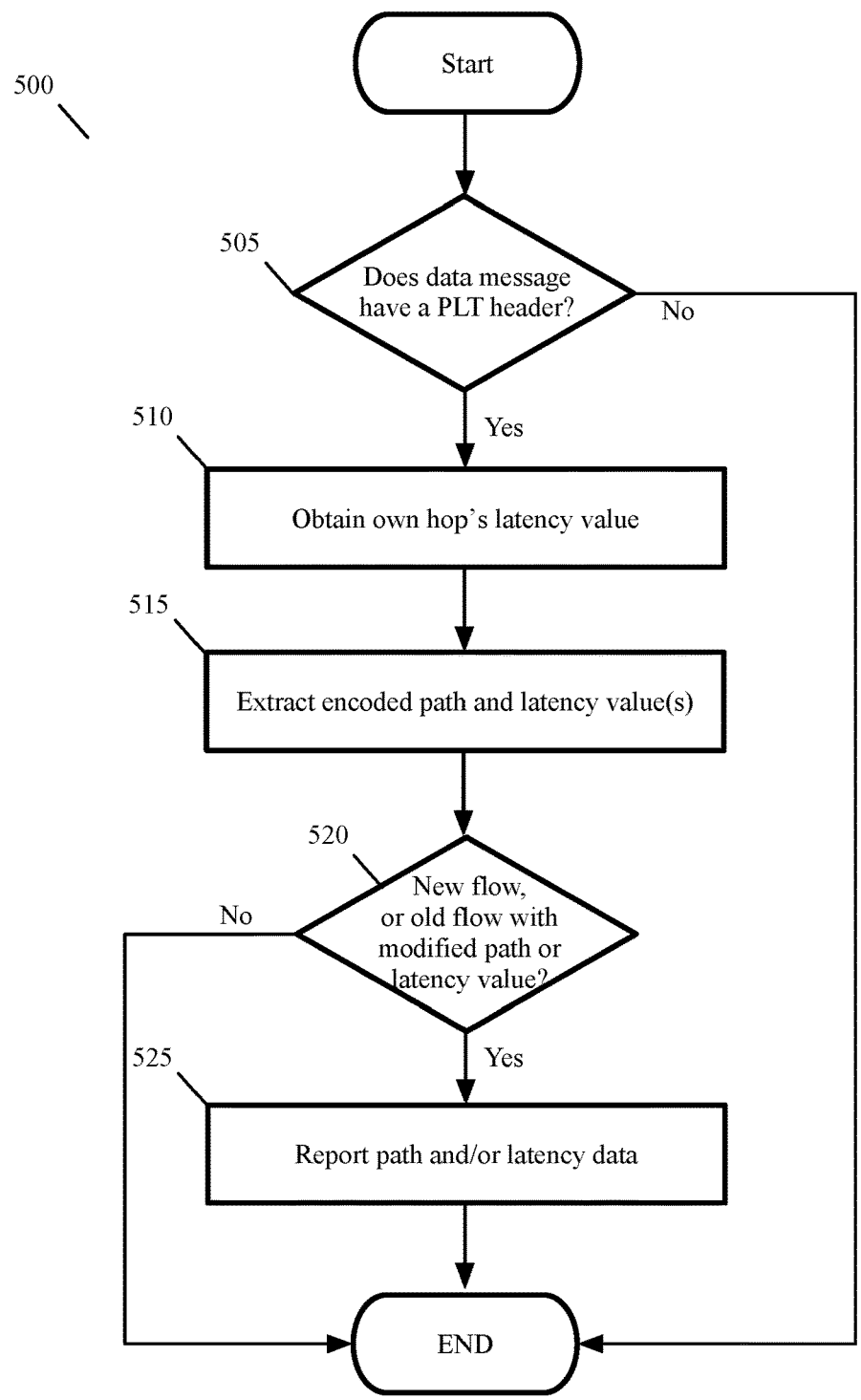

For some embodiments of the invention, FIGS. 3-5 illustrate the PLT processes 300-500 performed by the PLT operators of the first, intervening and last hops of a data message. The PLT process 300 of FIG. 3 is the process that the first hop 102 performs for a data message. The process 300 initially determines (at 305) whether the data message is one for which the path or hop latency has to be tracked. If not, the process ends.

Otherwise, the process 300 obtains (at 310) the current latency value that data messages experience on its forwarding element. In some embodiments, the latency value is expressed as the time delay for a packet that is received at an ingress port of the forwarding element to reach an egress port of the forwarding element. Next, at 315, the process inserts a PLT header in the data message's header. The PLT header is inserted in different locations of the data message header in different embodiments. Examples of such locations include a tunnel header of the data message, a header between the layers 3 and 4 header of the data message, or a header after the layer 4 header of the data message.

After 315, the process 300 generates (at 320) an encoded path value and an encoded latency value, or generates a combined encoded path and latency value. In some embodiments, the process 300 generates the encoded path value by applying a Boolean operator (e.g., an XOR) or a hash operator to its forwarding element's identifier. Also, in some embodiments, the process 300 generates the encoded latency value by discretizing its forwarding element's hop latency value to fall into one of a set of quantized latency values, and then applying a Boolean operator (e.g., an XOR) or a hash operator to this quantized value. In other embodiments, the process 300 generates one encoded value that represents both its forwarding identifier and its hop latency value, by discretizing its forwarding element's hop latency value to fall into one of a set of quantized latency values, and then applying a Boolean operator (e.g., an XOR) or a hash operator to a value that combines the quantized value and the first hop's identifier.

Next, at 325, the process inserts the encoded path and latency value(s) in the data message's PLT header. The process then inserts (at 330) its forwarding element identifier and hop latency values in the data message's PLT header. The process 300 then ends.

FIG. 4 illustrates a process 400 that intervening hops 104 and 106 perform for a data message that is sent from the machine 122 to machine 124. This process is similar to process 300 except that the process 400 does not insert a PLT header but detects the existence of this header. The process 400 also generates the encoded path and latency value(s) by first extracting the value(s) stored in the PLT header of the received data message.

The process 400 initially determines (at 405) whether the data message has a PLT header (e.g., detects whether a data message header has a flag that indicates the inclusion of a PLT header). If not, the process ends. Otherwise, the process 400 obtains (at 410) the current latency value that data messages experience on its forwarding element. Next, at 415, the process extracts the encoded path and latency value or values that are stored in the message's PLT header by the prior hops.

After 415, the process 400 generates (at 420) an encoded path value and an encoded latency value, or generates a combined encoded path and latency value. In some embodiments, the process 400 (1) generates the encoded path value by applying a Boolean operator (e.g., an XOR) or a hash operator to its forwarding element's identifier and the extracted encoded path value (i.e., the path extracted at 415), and (2) generates the encoded latency value by discretizing its forwarding element's hop latency value to fall into one of a set of quantized latency values (i.e., by selecting, from several quantized latency values, one of the quantized latency values that is associated with the forwarding element's latency value), and then applying a Boolean operator (e.g., an XOR) or a hash operator to this quantized value and the extracted encoded latency value (i.e., the latency value extracted at 415). In other embodiments, the process 400 generates one encoded value that represents both its forwarding identifier and its hop latency value, by discretizing its forwarding element's hop latency value to fall into one of a set of quantized latency values, and then applying a Boolean operator (e.g., an XOR) or a hash operator to the extracted combined encoded path/latency value and a value that combines the quantized latency value and its forwarding element identifier.

Next, at 425, the process inserts the encoded path and latency value(s) in the data message's PLT header. The process then inserts (at 430) its forwarding element identifier and hop latency values in the data message's PLT header. The process 400 then ends.

FIG. 5 illustrates a process 500 that the last hop 108 performs for a data message that is sent from the machine 122 to machine 124. The process 500 initially determines (at 505) whether the data message has a PLT header (e.g., detects whether a data message header has a flag that indicates the inclusion of a PLT header). If not, the process ends. Otherwise, the process 500 obtains (at 510) the current latency value that data messages experience on its forwarding element. Next, at 515, the process extracts the encoded path and latency value or values that are stored in the message's PLT header by the prior hops.

At 520, the process determines whether the data message is part of a new flow that terminates at a machine connected to its forwarding element, or is part of a previously received flow to one of its connected machines that has new encoded path and/or latency value. In some embodiments, the PLT operator of the last hop maintains the identifiers (e.g., five tuple identifiers) of previously received flows in a connection state storage. In these embodiments, the process 500 identifies a flow as a new flow when its flow identifier is not stored in the connection state storage. When a flow has its identifier in the connection state storage, the process determines (at 520) whether any encoded path value, encoded latency value, or combined encoded path/latency value that the process stores for the flow is different than an encoded path value, an encoded latency value, or a combined encoded path/latency value that the process extracted from the received data message's PLT header at 515.

When the process 500 determines (at 520) that the data message is part of a previously received flow and its encoded path and latency value or values have not changed, the process ends. Otherwise, when the process determines (at 520) that the data message is part of a new flow, or it is part of a previously received flow but its encoded path and/or latency value or values have changed, the process reports (at 525) the data message's path and latency data to the pre-processor 135 of its forwarding element, and then ends. The process also reports (at 525) the data message's path and latency data when the hop latency value at its forwarding has significantly changed so that it falls in a different quantized latency value. At 525, the process also stores the received encoded PLT value in the connection state storage for possible future use to check against encoded PLT values of other data messages that are part of the same flow. If the process stored a prior encoded PLT value for the message flow, it would discard this value and replace it with the newly received encoded PLT value. After 525, the process ends.

Figure 6:
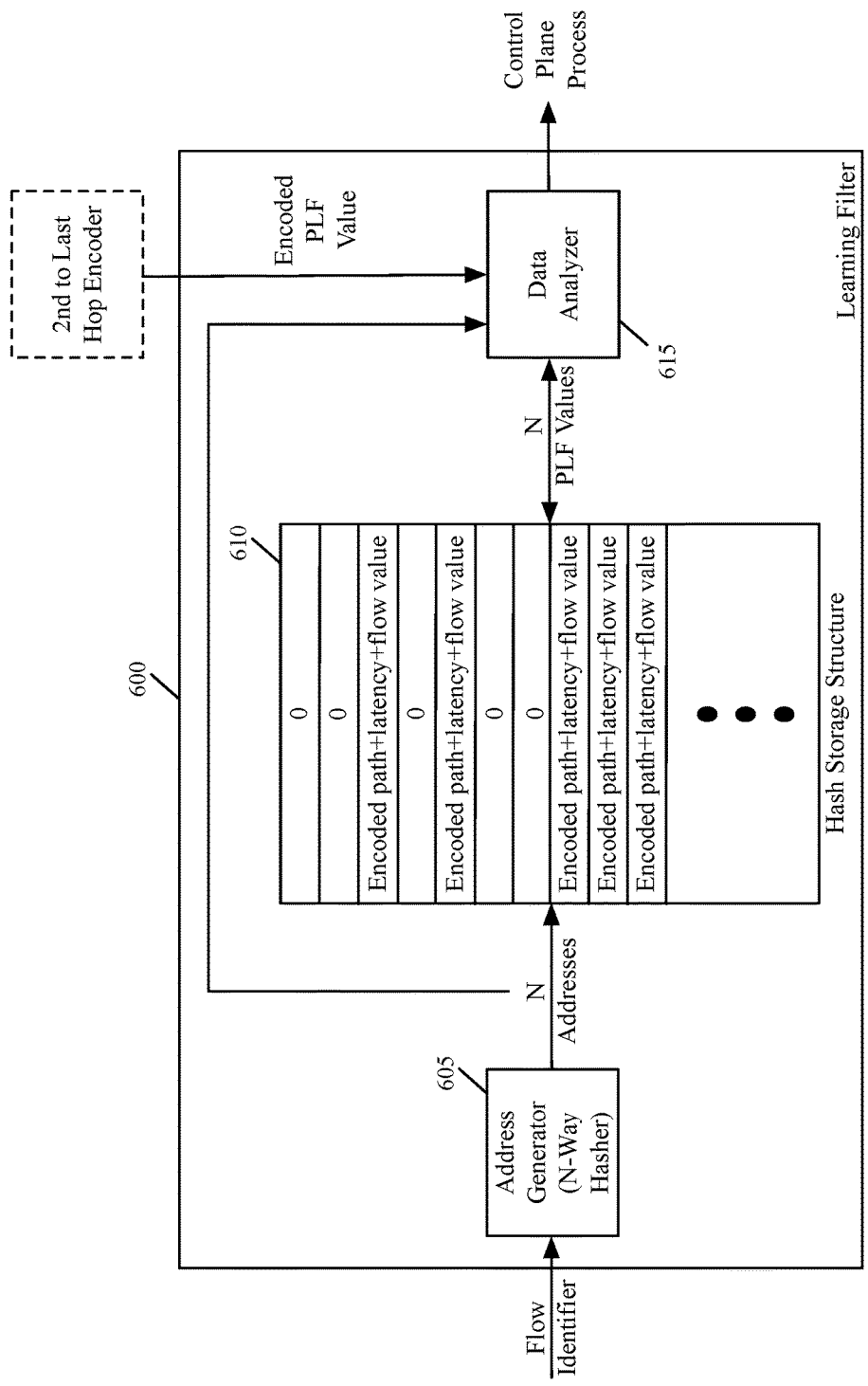
FIG. 6 illustrates a learning filter that the last hop PLT operator of some embodiments uses to identify new flows and to detect previously identified flows with modified PLT values.

Different embodiments use different connection state data storages. Some embodiments use learning filters. FIG. 6 illustrates a learning filter 600 that the last hop PLT operator of some embodiments uses to identify new flows and to detect previously identified flows with modified PLT values. The encoded values that are stored in the learning filter of some embodiments not only represent the path and latency values for each flow, but also include the flow identifier of the flow. In other words, the embodiments that use the learning filter 600 encode for each flow one value that expresses the flow's path, its hop latency values, and its identifier. These three tuples (path, hop latency, and flow identifier) are referred to as the encoded PLF (path, latency, and flow) values of the flow in the discussion below.

As shown, the learning filter 600 has an address generator 605, a hash storage 610, and a data analyzer 615. The address generator 605 is an N-way hasher that generates N hash values from a received data message's flow identifier (e.g., five tuple identifier). The N hash values represent addresses of N locations in the hash storage 610. This is because the learning filter stores the encoded PLF value for a flow at N different locations in the hash storage 610 in some embodiments.

All locations in the hash storage 610 are initialized to one value (e.g., to 0) at the start of the operation of the last hop forwarding element. Also, to clean up the learning filter, periodically different sections of the hash storage are reset to their initial values. This cleaning may lead the learning filter 600 to detect false positive events (e.g., new flows, or old flows with modified PLT data), but the control plane processes will catch these false positives.

The addresses produced by the address generator are supplied to the hash storage 610, which in response outputs the values stored at these addressed locations to the data analyzer 615. When any one of the values at N addressed locations is the initialized values (e.g., the value is a string of zeroes), the data analyzer determines that the received data message is part of a new flow. It therefore generates a report for the control plane that provides this message's flow identifier (e.g., five tuple identifier), and this flow's path information and hop latency values that were stored in the data message's header value and were then adjusted by the last hop's forwarding element identifier and latency value. The analyzer also stores the encoded PLF value that the last hop extracts from the data message header and stores this value at the N locations identified by the address generator 605.

When none of the values at the N addressed locations is the initialized value (e.g., none of the outputted values is a string of zeroes), the data analyzer determines whether at least one of the N outputted values matches the encoded PLF value that the last hop has extracted from the received data message's header. As shown in FIG. 6, the encoded PLF value is the PLF value that was stored in the data message's header by the PLT operator of the previous hop (i.e., by the second to last hop).

When none of the values at the N addressed locations is the initialized value, and at least one of the N outputted values matches the message's extracted, encoded PLF value, the data analyzer determines that the PLT data for the received data message's flow has not changed. Even though the PLT data has not changed, the data analyzer 615 stores the extracted, encoded PLF value at the N locations identified by the address generator 605.

On the other hand, when none of the values at the N addressed locations is the initialized value, but none of the N outputted values matches the message's extracted, encoded PLF value, the data analyzer generates a report for the control plane that provides this message's flow identifier (e.g., five tuple identifier), and this flow's path information and hop latency values that were stored in the data message's header value and were then adjusted by the last hop's forwarding element identifier and latency value. In this situation, the data analyzer also stores the extracted, encoded PLF value at the N locations identified by the address generator 605.

As mentioned above, the PLT operators 130 in some embodiments are implemented by the data-plane message processing stages of hardware forwarding elements in some embodiments. As such, these fast PLT operators perform their operations at the data line rates of the hardware forwarding elements.

Figure 7:
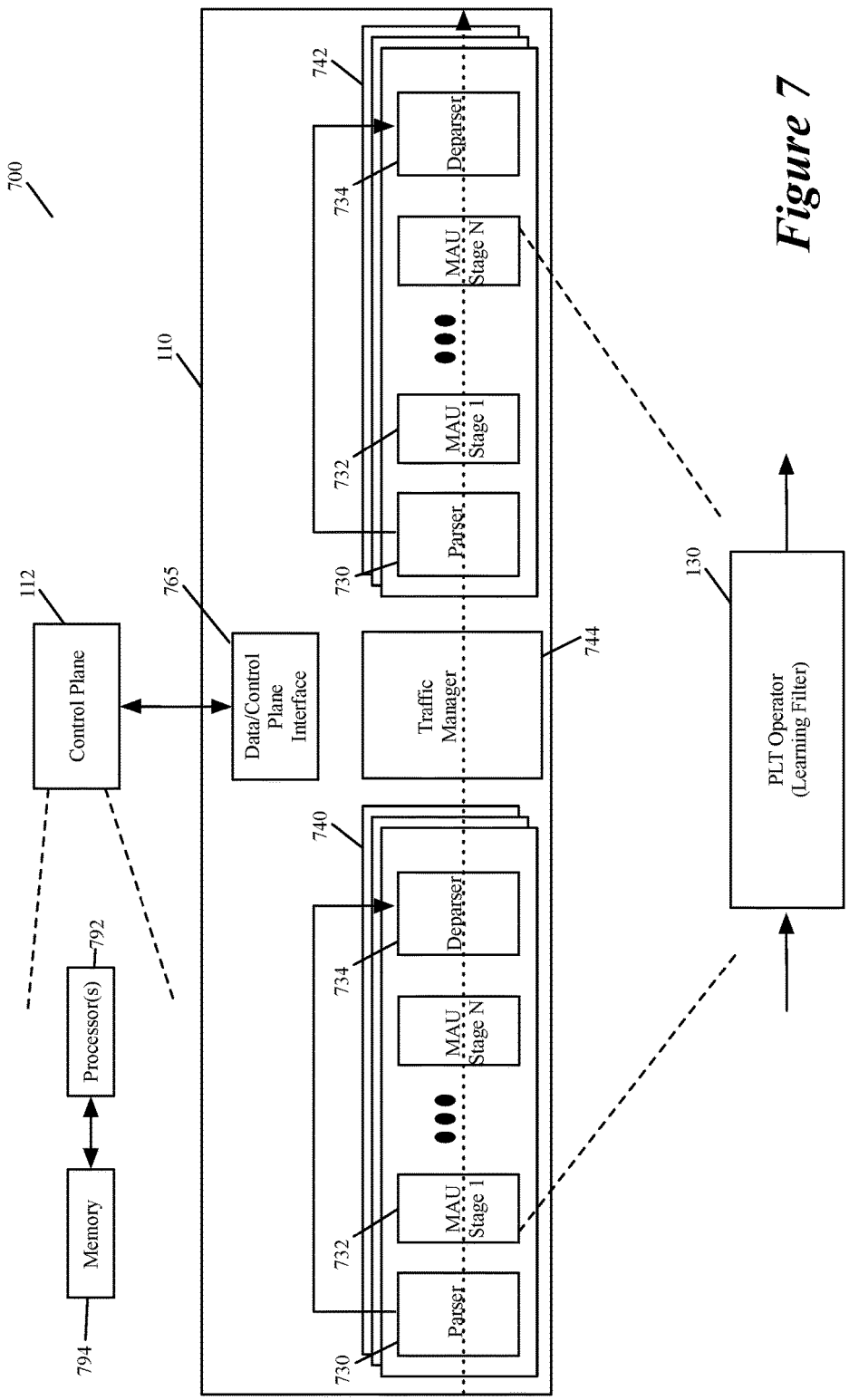
FIG. 7 illustrates a more-detailed view of a forwarding element, which has a data plane that implements a PLT operator of some embodiments.

FIG. 7 illustrates a more-detailed view of a forwarding element 700, which has a data plane 110 that implements a PLT operator of some embodiments. This figure also provides more-detailed view of a control plane 112 of the forwarding element 700 of some embodiments. As shown, the data plane 110 includes multiple message-processing pipelines, including multiple ingress pipelines 740 and egress pipelines 742. The data plane 110 also includes a traffic manager 744 that is placed between the ingress and egress pipelines 740 and 742. The traffic manager 744 serves as a crossbar switch that directs messages between different ingress and egress pipelines.

Each ingress/egress pipeline includes a parser 730, several MAU stages 732, and a deparser 734. A pipeline's parser 730 extracts a message header from a data message that the pipeline receives for processing. In some embodiments, the extracted header is in a format of a header vector (HV) that is processed, and in some cases modified, by successive MAU stages 732 as part of their message processing operations. The parser of a pipeline 730 passes the payload of the message to the pipeline's deparser 734 as the pipeline's MAU 732 operate on the header vectors. In some embodiments, the parser also passes the message header to the deparser 734 along with the payload (i.e., the parser passes the entire message to the deparser).

When a pipeline 740/242 finishes processing a data message, and the message has to be provided to the traffic management stage (in case of an ingress pipeline) or to an egress port (in case of an egress pipeline) to be forwarded to the message's next hop (e.g., to its destination compute node or next forwarding element) or to another module of the data or control plane, a deparser 734 of the pipeline in some embodiments, produces the data message header from the message's header vector that was processed by the pipeline's last MAU stage, and combines this header with the data message's payload. In some embodiments, the deparser 734 uses part of the header received from the parser 730 of its pipeline to reconstitute the message from its associated header vector.

In some embodiments, one or more MAU stages 732 of one or more ingress and/or egress pipelines are configured to implement the components of the PLT operator 130. As further described below, the MAU stages 732 in some embodiments include stateful arithmetic logic units with stateful memories, which allow the MAU stages to store PLT and PLF values, and implement learning filters in the data plane. These components operate at data line rates, which allow them to implement the PLT operator to operate at data line rates. The implementation of stateful ALUs in the data plane is further described in U.S. Published Patent Application 20170093986, which is incorporated herein by reference.

In some embodiments, the control plane 112 configures the data processing circuits of the data plane to implement the PLT operator 130 and to perform message-forwarding operations through the data/control plane interface 765. In some embodiments, multiple MAU stages are needed to implement the PLT operator. In these embodiments, earlier MAU stages write their outputs to the processed header vectors in order to make these outputs available for subsequent MAU stages that also implement the PLT operator. Also, the implemented PLT operator writes publishes its PLT and PLF values to the control plane 112 through the data plane/control plane interface 765. In some embodiments, the PLT operator writes these values to specific registers in this interface. In other embodiments, the PLT operator publishes these values by writing them to header vectors of data messages that are directed to one or more egress ports that are routed to the data/control plane interface 765. In some of these embodiments, the data plane has message generators that generate messages for the PLT operators to write to in order to publish their values to the control plane.

The control plane 112 includes one or more processors 792 (such as a microprocessor with multiple processing cores or units) that execute instructions and a memory 794 that stores instructions. These instructions can be specified by (1) a manufacturer of the network forwarding element that uses the forwarding IC 700, (2) a network administrator that deploys and maintains the network forwarding element, or (3) one or more automated processes that execute on servers and/or network forwarding elements that monitor network conditions. A processor 792, or another circuit of the control plane, communicates with the data plane through the control/data plane interface 765.

Figure 8:
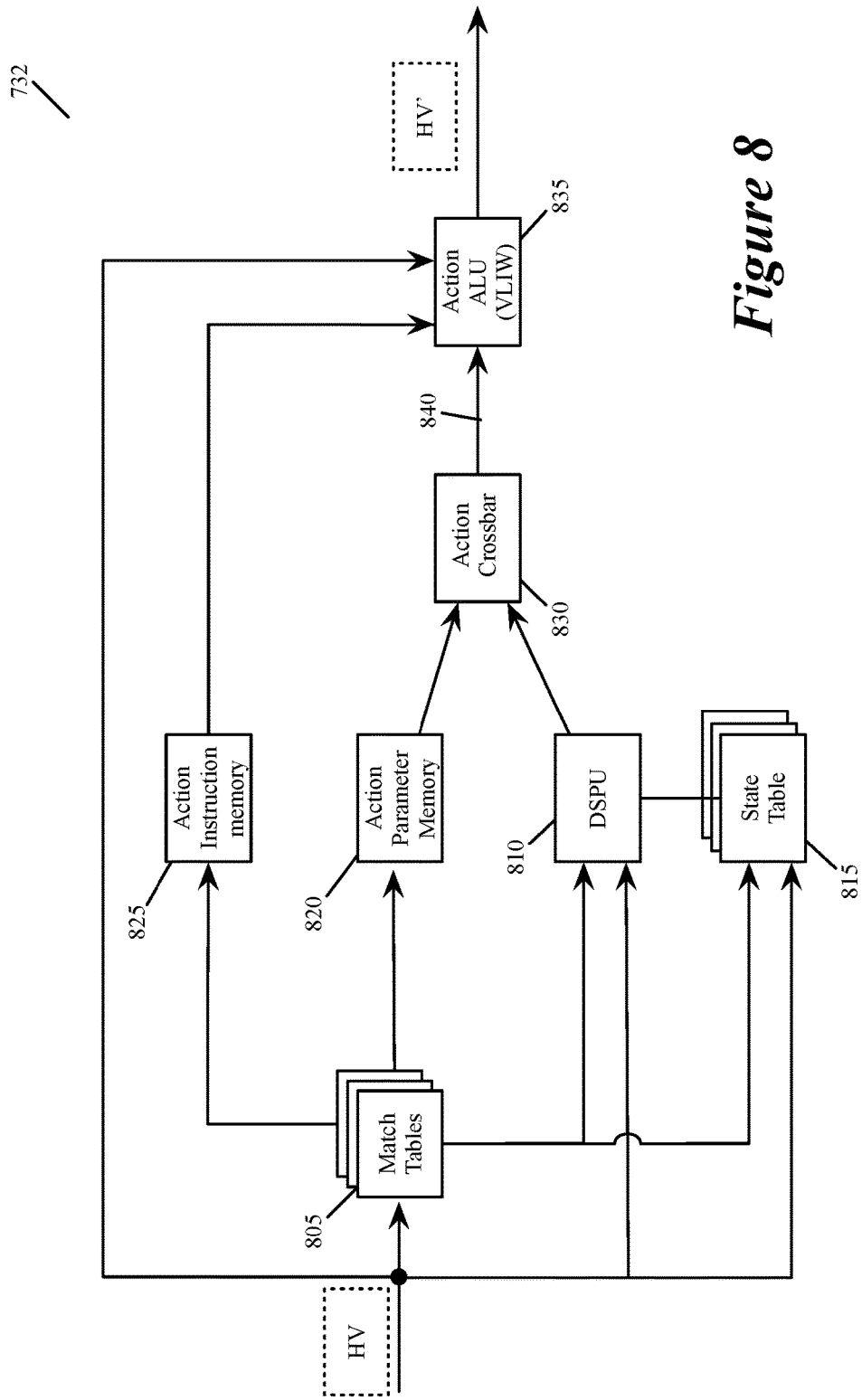
FIG. 8 illustrates an example of a match-action unit of some embodiments.

FIG. 8 illustrates an example of a match-action unit of some embodiments. As mentioned above, an ingress pipeline 740 or egress pipeline 742 in some embodiments has several MAU stages 732, each of which includes message-processing circuitry for forwarding received data messages and/or performing stateful operations based on these data messages. These operations are performed by processing values stored in the header vectors of the data messages.

As shown in FIG. 8, the MAU 732 in some embodiments has a set of one or more match tables 805, a data plane stateful processing unit 810 (DSPU), a set of one or more stateful tables 815, an action crossbar 830, an action parameter memory 820, an action instruction memory 825, and an action arithmetic logic unit (ALU) 835. The match table set 805 can compare one or more fields in a received message's header vector (HV) to identify one or more matching flow entries (i.e., entries that match the message's HV). The match table set can include TCAM tables or exact match tables in some embodiments. In some embodiments, the match table set can be accessed at an address that is a value extracted from one or more fields of the message's header vector, or it can be a hash of this extracted value. In some embodiments, the local control plane or a remote controller supplies flow entries (e.g., the flow-match identifiers and/or action identifiers) to store in one or more match tables In some embodiments, the value stored in a match table record that matches a message's flow identifier, or that is accessed at a hash-generated address, provides addresses of records to be accessed in the action parameter memory 820 and action instruction memory 825. Also, such a value from the match table can provide an address and/or parameter for one or more records in the stateful table set 815, and can provide an instruction and/or parameter for the DSPU 810. As shown, the DSPU 810 and the stateful table set 815 also receive a processed message's header vector. The header vectors can include instructions and/or parameters for the DSPU, while containing addresses and/or parameters for the stateful table set 815.

The DSPU 810 in some embodiments performs one or more stateful operations, while a stateful table 815 stores state data used and generated by the DSPU 810. In some embodiments, the DSPU is a programmable arithmetic logic unit (ALU) that performs operations synchronously with the dataflow of the message-processing pipeline (i.e., synchronously at the line rate). As such, the DSPU can process a different header vector on every clock cycle, thus ensuring that the DSPU would be able to operate synchronously with the dataflow of the message-processing pipeline. In some embodiments, a DSPU performs every computation with fixed latency (e.g., fixed number of clock cycles). Examples of such operations include the storing the PLT and PLF values for the PLT operator, comparing newly received PLT and PLF values to previously stored values, and implementing the learning filter functionality. In some embodiments, the local or remote control plane provides configuration data to program a DSPU.

The DSPU 810 outputs an action parameter to the action crossbar 830. The action parameter memory 820 also outputs an action parameter to this crossbar 830. The action parameter memory 820 retrieves the action parameter that it outputs from its record that is identified by the address provided by the match table set 805. The action crossbar 830 in some embodiments maps the action parameters received from the DSPU 810 and action parameter memory 820 to an action parameter bus 840 of the action ALU 835. This bus provides the action parameter to this ALU 835. For different data messages, the action crossbar 830 can map the action parameters from DSPU 810 and memory 820 differently to this bus 840. The crossbar can supply the action parameters from either of these sources in their entirety to this bus 840, or it can concurrently select different portions of these parameters for this bus.

The action ALU 835 also receives an instruction to execute from the action instruction memory 825. This memory 825 retrieves the instruction from its record that is identified by the address provided by the match table set 805. The action ALU 835 also receives the header vector for each message that the MAU processes. Such a header vector can also contain a portion or the entirety of an instruction to process and/or a parameter for processing the instruction.

The action ALU 835 in some embodiments is a very large instruction word (VLIW) processor. The action ALU 835 executes instructions (from the instruction memory 835 or the header vector) based on parameters received on the action parameter bus 840 or contained in the header vector. The action ALU stores the output of its operation in the header vector in order to effectuate a message forwarding operation and/or stateful operation of its MAU stage 732. The output of the action ALU forms a modified header vector (HV') for the next MAU stage.

In other embodiments, the match tables 805 and the action tables 815, 820 and 825 of the MAU stage 732 can be accessed through other methods as well. For instance, in some embodiments, each action table 815, 820 or 825 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 805. As in the case of a match table 805, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

The indirect addressing scheme accesses an action table by using an address value that is extracted from one or more records that are identified in the match table set 805 for a message's header vector. As mentioned above, the match table records are identified through direct addressing or record matching operations in some embodiments.

The independent address scheme is similar to the direct addressing scheme except that it does not use the same address that is used to access the match table set 805. Like the direct addressing scheme, the table address in the independent addressing scheme can either be the value extracted from one or more fields of the message's header vector, or it can be a hash of this extracted value. In some embodiments, not all the action tables 815, 820 and 825 can be accessed through these three addressing schemes, e.g., the action instruction memory 825 in some embodiments is accessed through only the direct and indirect addressing schemes.

Figure 9:
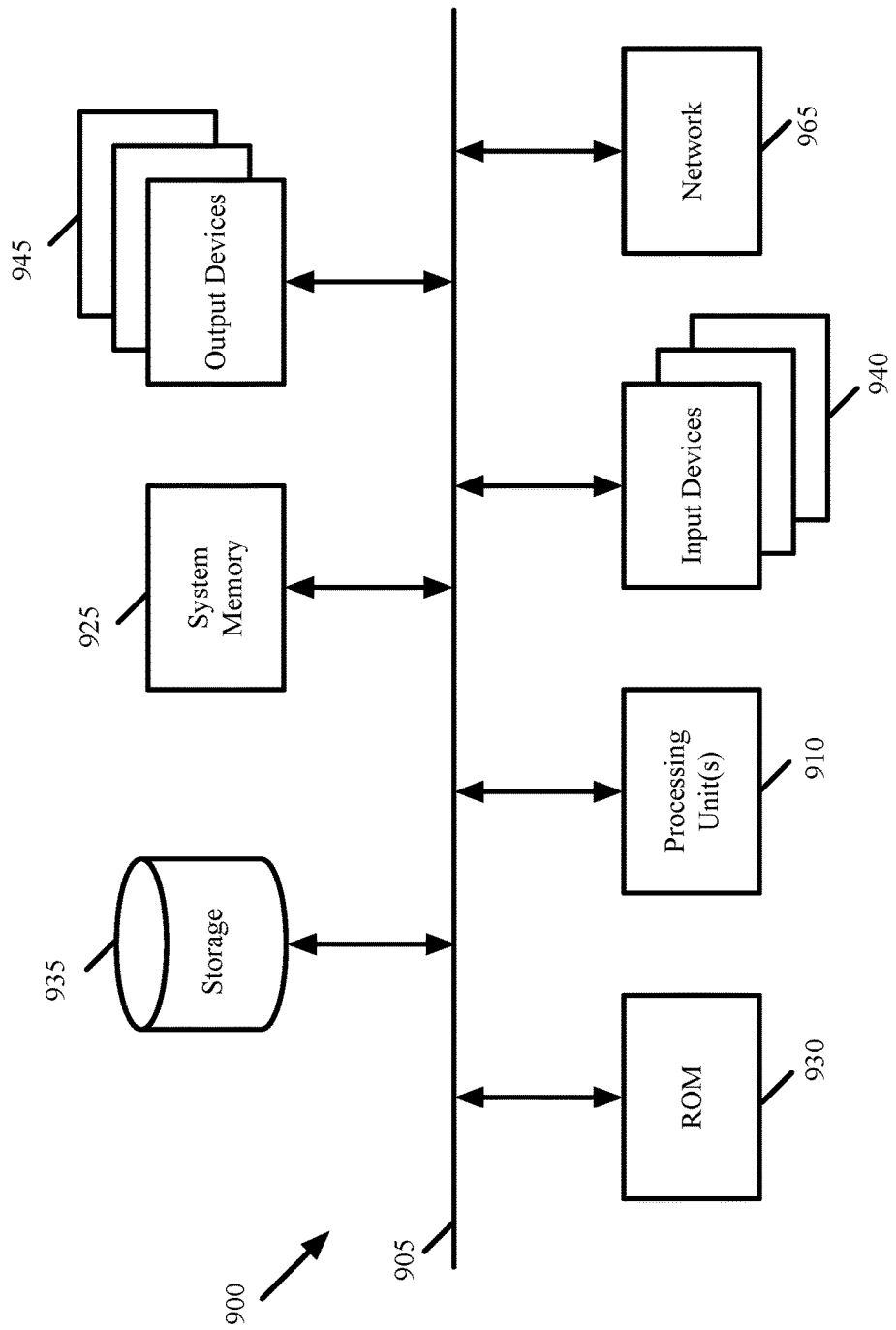
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), or any other sort of electronic device. The electronic system 900 can also implement the control plane modules of some embodiments. As shown, the electronic system includes various types of computer readable media and interfaces for various other types of computer readable media. Specifically, the electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935. From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures (e.g., FIGS. 3, 4, and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, in the embodiments described above, the data plane operators collect and report both path and hop latency values to the control plane processes. In other embodiments, these data plane operators only collect path data or hop latency values, and report one such set of values to the control plane processes. In still other embodiments, these data plane operators collect other tracking data for each forwarding element along the path. One example of such other data is queue depth at each forwarding element along the path. Therefore, one of ordinary skill in the art would understand that the invention is not to be limited by the foregoing illustrative details, but rather is to be defined by the appended claims.

What is claimed is:

1. For a network comprising a plurality of forwarding elements, a particular forwarding element comprising:
   a data-plane forwarding circuit comprising a plurality of configurable data processing circuits in a plurality of data processing stages, the data processing circuits configured to implement:
      (i) a plurality of message forwarding circuits to process data tuples associated with data messages received by the IC forwarding element in order to forward the data messages within the network, wherein a particular message associated with a particular message flow stores a path identifier that identifies a set of forwarding elements that the particular message traversed to reach the particular forwarding element and each of a plurality of the forwarded data messages stores an encoded path identifier that is derived by encoding the path identifier of each message into a more compact format; and
      (ii) a path-tracking circuit to identify paths through the network that data message flows take to reach the particular forwarding element and to detect when a data message flow changes its path by storing, in a set of data plane memories, the encoded path identifier for each message flow that is contained in the last received message in that flow, and comparing the encoded path identifier stored in each message with the encoded path identifier that the path-tracking circuit stores for that message's flow in order to determine whether that message has taken a different path than prior messages in that message's flow to reach the particular forwarding element, wherein the compact formats of the encoded path identifiers allow the path-tracking circuit to process more quickly the encoded path identifiers; and
   a control-plane circuit to configure the configurable data processing circuits of the data plane forwarding circuit to implement the message forwarding circuits and the path-tracking circuit.

2. The forwarding element of claim 1, wherein the path-tracking circuit inserts an identifier of the particular forwarding element in the path identifier of the particular message before forwarding the particular message to a next forwarding element in the particular message's path to a destination device within the network.

3. The forwarding element of claim 1, wherein
   the path-tracking circuit reports the path identifier of a message in the plurality of messages to the control plane circuit when the message's stored encoded path identifier differs from the encoded path identifier that the path-tracking circuit stores for that message's flow;
   the control plane process analyzes the path identifier of the message to identify how the path of the message's flow has changed from a previous path stored by the control plane, said control plane storing the reported path identifier to have a record of the path taken by the message's flow.

4. The forwarding element of claim 1, wherein
   the path-tracking circuit reports the path identifier of a message in the plurality of messages to the control plane circuit when the message's stored encoded path identifier differs from the encoded path identifier that the path-tracking circuit stores for that message's flow,
   the control plane process forwards the reported path identifier to a remote monitor server that analyzes the path identifier of the message to identify how the path of the message's flow has changed from a previous path stored by the control plane, said monitor storing the reported path identifier to have a record of the path taken by the message's flow.

5. The forwarding element of claim 1, wherein when a message's stored encoded path identifier differs from the encoded path identifier that the path-tracking circuit stored for that message's flow, the path-tracking circuit discards the encoded path identifier that it stored for the message's flow and stores in the memory the encoded path identifier that the message stores.

6. The forwarding element of claim 1, wherein the path-tracking circuit replaces the encoded path identifier stored in at least one message in the plurality of messages with an encoded path identifier that also accounts for the particular forwarding element's identifier, before the message is forwarded to a next hop by the forwarding element.

7. The forwarding element of claim 1, wherein the encoded path identifier is generated by having a hash generator compute a hash value from the path identifier.

8. The forwarding element of claim 1, wherein the encoded path identifier is generated by having an XOR operator compute a multi-bit XOR value by supplying corresponding bits of the forwarding element identifiers of the forwarding elements in the path to an XOR gate to compute an XOR value for each bit.

9. The forwarding element of claim 1, wherein the data plane memory is a stateful memory of a stateful date plane processing unit that is used to implement the path tracking circuit.

10. For a network comprising a plurality of forwarding elements, a method of processing data messages in a data-plane forwarding circuit of a particular forwarding element, the method comprising:

receiving configuration data to configure data processing circuits in a plurality of message processing stages of the data-plane forwarding circuit;

using the configuration data to configure a subset of the data processing circuits to perform message forwarding operations that process data tuples associated with data messages received by the particular forwarding element in order to forward the data messages within the network, wherein a particular message associated with a particular message flow stores a path identifier that identifies a set of forwarding elements that the particular message traversed to reach the particular forwarding element and each of a plurality of the forwarded data messages stores an encoded path identifier that is derived by encoding the path identifier of each message into a more compact format; and using the configuration data to configure a subset of the data processing circuits to perform path-tracking operations that identify paths through the network that data message flows take to reach the particular forwarding element and to detect when data message flows change their path to the particular forwarding element by storing, in a set of data plane memories, the encoded path identifier for each message flow that is contained in the last received message in that flow, and comparing the encoded path identifier stored in each message with the encoded path identifier that the path-tracking circuit stores for that message's flow in order to determine whether that message has taken a different path than prior messages in that message's flow to reach the particular forwarding element, wherein the compact formats of the encoded path identifiers allow the path-tracking circuit to process more quickly the encoded path identifiers.

11. The method of claim 10, wherein receiving the configuration data comprises receiving the configuration data from a control-plane circuit of the forwarding element.

12. The method of claim 10, wherein performing path-tracking operations comprises inserting an identifier of the particular forwarding element in the path identifier of the particular message before forwarding the particular message to a next forwarding element in the particular message's path to a destination device within the network.

13. The method of claim 10, wherein performing the path-tracking operations further comprises:

reporting the path identifier of a message in the plurality of messages to the control plane circuit when the message's stored encoded path identifier differs from the encoded path identifier that the path-tracking operations store for that message's flow;

the control plane process analyzing the path identifier of the message to identify how the path of the message's flow has changed from a previous path stored by the control plane, said control plane storing the reported path identifier to have a record of the path taken by the message's flow.

14. The method of claim 10, wherein performing the path-tracking operations further comprises:

reporting the path identifier of a message in the plurality of messages to the control plane circuit when the message's stored encoded path identifier differs from the encoded path identifier that the path-tracking operations store for that message's flow, the control plane process forwarding the reported path identifier to a remote monitor server that analyzes the path identifier of the message to identify how the path of the message's flow has changed from a previous path stored by the control plane, said monitor storing the reported path identifier to have a record of the path taken by the message's flow.

15. The method of claim 10 wherein when a message's stored encoded path identifier differs from the encoded path identifier that the path-tracking circuit stored for that message's flow, performing the path-tracking operations further comprises discarding the encoded path identifier that it stored for the message's flow and storing in the memory the encoded path identifier that the message stores.

* * * * *